United States Patent [19]

Forsten et al.

[11] 4,361,619

[45] Nov. 30, 1982

[54] FILTER OF POLY(TETRAFLUOROETHYLENE) AND GLASS FIBERS

[75] Inventors: Herman H. Forsten, Hockessin; Peter E. Frankenburg; Jagdish N. Shah, both of Wilmington, all of Del.

[73] Assignee: E. I. Du Pont de Nemours and Company, Wilmington, Del.

[21] Appl. No.: 265,444

[22] Filed: May 20, 1981

[51] Int. Cl.$^3$ ............... B01D 39/16; B01D 39/20; B32B 31/08; D04H 1/46
[52] U.S. Cl. ............... 428/234; 28/112; 55/528; 55/DIG. 5; 210/505; 428/280; 428/282; 428/285; 428/286; 428/297; 428/300; 428/359
[58] Field of Search ............... 55/528, DIG. 5; 210/505; 428/215, 234, 285, 286, 280, 282, 359, 297, 300; 28/112

[56] References Cited

U.S. PATENT DOCUMENTS

| | | | |
|---|---|---|---|
| 2,893,105 | 7/1959 | Lauterbach . | |
| 2,933,154 | 4/1960 | Lauterbach . | |
| 3,018,845 | 1/1962 | Powers | 210/505 |
| 3,197,946 | 8/1965 | Taylor | 55/528 |
| 3,506,133 | 4/1970 | Lee | 210/505 |
| 3,796,659 | 3/1974 | Jones | 210/505 |
| 3,986,851 | 10/1976 | Grodek | 55/DIG. 5 |
| 4,093,437 | 6/1978 | Ichihara et al. | 55/528 |
| 4,210,540 | 7/1980 | Perrotta | 210/505 |

OTHER PUBLICATIONS

Dietrich, *Filtration and Separation*, Jul.–Aug. (1972), pp. 438–443.

Primary Examiner—James C. Cannon

[57] ABSTRACT

65–99 percent by weight poly(tetrafluoroethylene) fibers and 1–35 percent by weight glass fibers are combined in an intimate blend suitable for the preparation of filter felts having reduced leakage while maintaining high permeability to gas flow.

11 Claims, No Drawings

FILTER OF POLY(TETRAFLUOROETHYLENE) AND GLASS FIBERS

This invention relates to intimate blends of poly(tetrafluoroethylene) (PTFE) and glass fibers suitable for the preparation of felts for gas filters and a process for preparing the felts. More particularly, the invention relates to a composite filter felt comprised of a needled nonwoven batt containing an intimate blend of PTFE and glass fibers.

BACKGROUND OF THE INVENTION

Synthetic-fiber felts useful as filters are known, e.g., from U.S. Pat. No. 2,910,763 as are such felts containing PTFE fibers, e.g., from U.S. Pat. Nos. 2,893,105 and 2,933,154. U.S. Pat. No. 2,893,105 suggests the possibility of blending PTFE fibers with other fibers, inter alia, glass. Filters containing PTFE fibers are advantageous because they have outstanding resistance to high temperatures, chemical attack and abrasion. However, commercially available filters containing these fibers often permit passage of more particulate matter than is desirable under today's increasingly rigorous environmental standards.

This invention provides an intimate blend of poly(tetrafluoroethylene) and glass fibers which in the form of felts provides markedly reduced leakage while maintaining high permeability to gas flow. In addition, the felts show reduced blinding in use, are readily cleaned and exhibit remarkable resistance to wear within the claimed blend levels.

SUMMARY OF THE INVENTION

This invention provides an intimate blend of 2–25 denier per filament poly(tetrafluoroethylene) and 0.1–1 denier per filament glass fibers containing 1–35 percent by weight of glass fibers. The invention also provides an improved filter felt comprising a needled batt of an intimate blend of poly(tetrafluoroethylene) and glass staple fibers wherein the blend contains 65–99 percent by weight poly(tetrafluoroethylene) fibers having a denier of 2–25 dpf and 1–35 percent by weight glass fibers having a denier of 0.1–1 dpf. Preferably 1–25% by weight glass fibers are used and most preferably 1–10 percent by weight glass fibers are used. Preferably the filter felt contains a supporting scrim which most preferably is a woven fabric of poly(tetrafluoroethylene) fibers. Preferably the poly(tetrafluoroethylene) fibers have a denier of 5–10. Preferably the glass fibers have a denier per filament of 0.2–0.4.

This invention also provides a process for preparing the filter felt by blending 65–99 percent by weight poly(tetrafluoroethylene) fibers with 1–35 percent by weight glass fibers in a picker, further blending the fibers in a carding machine, forming a nonwoven batt if necessary by crosslapping, combining layers of the batt to form a layered batt of the desired thickness, needling the batt with a needle loom to provide a felt and heat setting the felt by heating on a tenter frame for at least two minutes at 230°–325° C. Preferably the layered batt is needled into a woven scrim of poly(tetrafluoroethylene) fibers. Preferably the batt is needled to the extent of 200 to 400 needle penetrations per cm$^2$.

DETAILED DESCRIPTION OF THE INVENTION

PTFE fibers may be prepared by blending an aqueous dispersion of PTFE particles with a viscose solution so that the blend contains 10 to 60 percent by weight PTFE and 1–8 percent by weight of cellulose, wet spinning the blend into a coagulating bath, washing and drying the resulting fibers and heating the fibers at a temperature sufficient to decompose the cellulose and sinter the PTFE particles. Such a process is described in U.S. Pat. No. 2,772,444. Optionally, the fibers may be bleached by a variety of oxidation processes utilizing hot nitric acid or hot air as oxidant.

PTFE fibers also may be prepared from slit PTFE film as described in U.S. Pat. No. 3,664,915.

Other PTFE fibers may be prepared by skiving from a sintered billet of PTFE followed by slitting. This process was described by Dr. J. Lenz at the 16th International Man-Made Fiber Conference held Sept. 20, 1977 in Dornbin, Austria.

Still other PTFE fibers may be prepared by extrusion of a plasticized mixture of PTFE particles and hydrocarbon solvent to form a film which after evaporation of hydrocarbon solvent is sintered, slit and drawn to obtain fiber-like material.

Useful glass fibers are typical continuous or spun glass fiber available commercially. The glass fibers used in the examples were obtained from Owens Corning. The glass fibers were cut to desired staple length on a Lummus cutter. For ease of processing, crimped glass fibers may be used.

The filter felt of this invention may be prepared by (1) blending poly(tetrafluoroethylene) fibers with glass fibers in a picker followed by (2) one or two passes through a suitable carding machine to provide a web of an intimate blend of poly(tetrafluoroethylene) and glass fibers, (3) cross-lapping the carded web from the carding machine and combining the resulting batt into a layered batt, if necessary, to provide the desired weight, (4) lightly needling the layered batt on one or both sides using a needle loom and (5) further needling the batt on one or both sides either alone or when combined on one or both sides of a woven scrim to produce a felt. The batts of blended fibers may also be prepared using an air-lay.

The felt may be heat set if desired by placing the uncompacted felt on a tenter frame and passing the felt through an oven. A tenter frame is a device well known by those skilled in the art. The tenter frame provides means for holding the edges of the felt during heat treatment, for example, pins, which pull the felt through the oven and prevent excessive shrinkage of the felt.

The oven will have a means for heating the felt. The means can be air having a temperature of 230°–325° C., preferably 240°–275° C., and most preferably 250°–265° C. Preferably air jets will be used to blow the hot air against both the upper and lower surfaces of the felt. The felt will advance through the oven on the tenter frame at a rate exceeding 18 m./min., preferably 20–35 m./min. and most preferably about 25–30 m./min.

The dwell time in the oven should be at least 2 minutes and preferably about 3 minutes. The felt may have more than two changes of direction in the oven. The angle of the change of direction may vary from about 45° to about 240°, but is preferably 135°–235° and is most preferably 160°–200°. It is preferable to have at least 7 changes of direction. The changes of direction may be accomplished by means of rollers. Preferred rollers have a diameter greater than about 30 cm., most preferably, between about 40 and 50 cm. It may be desirable for the felt to undergo more than one pass through the oven.

The filter felts of the present invention have improved filtration efficiency over commercially available felts of poly(tetrafluoroethylene) fibers, particularly at very high gas velocities, e.g., 2.1–6.1 m./min. Even those filter felts having 1 percent by weight glass fibers have markedly improved properties.

TESTS AND MEASUREMENTS

MIT Fold Endurance Test (ASTM-D-643)

In this test, test strips 1 cm. wide and 12.7 cm. long are held between jaws under a tension of 2.27 kg. One set of jaws is stationary while the other is cycled back and forth through an angle of 270°. The number of cycles until failure at the point of bending is recorded.

Taber Abrasion (ASTM-D-1175)

A 12.7×12.7 cm. sample is mounted on a flat surface. Two grinding wheels (size CS-10 medium abrasion and hardness) under a load of 250 g. are rotated on the sample for 5000 revolutions. The weight loss of the sample due to abrasion is determined.

Air Permeability (ASTM-D-737-69)

The porosity of the felt is determined by the Standard Method of Test for Air Permeability of Textile Fabrics, also known as the Frazier Air Porosity Test.

Air porosity or air permeability is the rate of air flow through a material under a differential pressure between the two fabric surfaces. Air permeability is expressed in cubic meters of air per minute per square meter of fabric at a stated pressure differential between the two surfaces of the fabric. Measurements reported herein are made at a differential water gauge pressure of 1.27 cm. and converted to $m.^3/min./m.^2$.

Basis Weight

Basis weight is determined by weighing a known area of felt and converting to $g./m.^2$.

Thickness

Thickness is measured with a spring-loaded thickness gauge at a pressure of $0.93 \text{ g./cm.}^2$.

Filtration Efficiency

To determine efficiency for particle arrestance, the Gravimetric method is used. In this test, known amounts of test dust are fed incrementally at a controlled rate using compressed air regulated through a pressure valve and solenoid switch. Efficiency is determined by placing a pre-weighed" absolute" filter (pore size equals 0.8 microns) downstream of the test specimen. The weight gained by the "absolute" filter constitutes the amount of dust penetrated through the test specimen. The test uses a scaled-down wind tunnel and is carried out as follows:

Filtration efficiency is carried out on 11.43×16.51 cm. test samples at 2.1, 3.4, 4.6 and 6.1 m./min. air velocity by adding a standard fly ash dust to the air and collecting and weighing the amount of fly ash passing through the test sample.

The standard fly ash dust consists of a well characterized fly ash collected by Philadelphia Electric Co. from the burning of low sulfur West Virginia coal at Eddystone, Pa. The particle size distribution is:

| Size Range (Microns) | Percent By Weight |
| --- | --- |
| 0–6.2 | 10 |
| 6.3–9.4 | 15 |
| 9.5–17.5 | 25 |
| 17.6–33.5 | 25 |
| 33.6–54.0 | 15 |
| >54.0 | 10 |

The general procedure follows:

1. The samples are pre-coated with fly ash dust by tumbling with excess dust in a tumble-dryer for 30–60 minutes.

2. The samples are installed in the tester, and air at 2.1 m./min. containing fly ash dust is passed through the sample for a break-in period of 16–24 hours with 2.79 $kg./cm.^2$ pulse jet cleaning for 0.01 second every 15 minutes. Air temperature is 65.5° C.

3. The fly ash dust content of the air is maintained in the range of 9.2–18.4 g./actual cubic meter of air. The amount of fly ash dust leaking through the test sample is collected and weighed at air velocities of 2.1, 3.3, 4.6 and 6.1 m./min. in separate two hour experiments. Percent leakage for each air velocity is calculated from the formula $$\% \text{ leakage} = \frac{\text{wt. of dust passing through test sample}}{\text{wt. of dust fed}} \times 100$$

EXAMPLE 1

Poly(tetrafluoroethylene) fibers (6.7 denier per filament, 11.4 cm. long) are blended by hand with glass fibers ("E" type, 0.2 denier per filament, 7.6 cm. long) in a weight ratio of 75% PTFE and 25% glass. The blended fibers are passed through a picker and then through a laboratory Garnett card. The resulting web is combined in layers to provide a 271 $g./m.^2$ batt. Very little fiber is lost during carding.

A section of the felt is laid on a 125 $g./m.^2$ scrim of poly(tetrafluoroethylene) fibers woven from 400 denier PTFE yarn (Sample 1), other sections of the batt are laid on both sides of the scrim (Sample 2) and two layers of the batt are laid on the same side of the scrim (Sample 3).

The samples are individually needle punched from the batt side(s) for four passes through a needle loom. The resulting felts are heat set at 250° C. for five minutes. Shrinkage is about 15%.

The properties of the felts along with a 100% PTFE control are summarized in Table I. The air flow is 2.1 m./min. The fly ash used is different from that described above. It is a fly ash classified from a coal-fired boiler at the Du Pont Waynesboro, Va. manufacturing facility. It has the following particle size distribution:

| Size Range (microns) | Percent by Weight |
| --- | --- |
| 0–1 | 3 ± 1 |
| 1–3 | 8 ± 2 |
| 3–5 | 45 ± 5 |
| 5–8 | 26 ± 3 |
| >8 | 18 ± 2 |

TABLE I

| Sample | % Glass, Blend | Basis Wt. g/m² | Thickness cm | Felt Density g/cm³ | Packing* Density % Fiber | % Leakage |
|---|---|---|---|---|---|---|
| Control | 0 | 787 | .132 | 0.596 | 27.1 | .32 |
| 1 | 25 | 461 | .256 | 0.178 | 8.1 | .08 |
| 2 | 25 | 722 | .343 | 0.225 | 10.2 | .05 |
| 3 | 25 | 760 | .308 | 0.247 | 11.2 | .0005 |

* $\frac{\text{felt density}}{\text{fiber density}} \times 100$

Similar results are obtained using an $Al_2O_3$ dust which is considerably finer than the fly ash described above.

EXAMPLE 2

PTFE fibers having a denier of 6.7 dpf and a length of 11.43 cm. are mixed with glass fibers having a denier of 0.3 dpf and a length of 5.08 cm. in a double cylinder picker. Premixing in a picker is considered highly beneficial to subsequent processing, i.e., by helping prevent easy separation of the two fibers during carding. Batts are prepared having 0, 3, 12, 21, 35, 50, 80, 86 and 100 percent by weight glass fibers. An antistatic spring (JIF, Schaefer Paint Co.) is applied to the blended fibers before carding. The resulting fiber blends were further blended while passing them twice through a laboratory Garnett card. The resulting webs are cross-lapped to provide the desired basis weight. Carding of blends containing more than 50 percent by weight glass fibers is extremely difficult.

Each of the cross-lapped batts is then manually laid on one side of a 125 g./m.² woven PTFE fiber scrim. Fibers of the loose batts were subsequently needle punched into the scrim from the batt side using 36 gauge, 9 barb needles, 11.1 mm. penetration, 55 penetrations/cm.²/pass and a total of seven passes through the needle loom.

The composite structures are heat set on a pin frame for 5–6 minutes at 260° C. allowing 5–10 percent shrinkage. Characterization of the products is summarized in Tables II and III.

TABLE II

Properties of PTFE/Glass Filters

| % Glass, Blend | Basis wt./ g./m.² | Thickness cm | MIT Cycles to Failure Warp | Taber Abrasion Wt. Loss % | Air Permeability m.³/min./m.² |
|---|---|---|---|---|---|
| 0 | 648 | 0.277 | 570,000 | 0 | 24.4 |
| 3 | 661 | 0.297 | 560,000 | 0 | 21.6 |
| 12 | 780 | 0.330 | 500,000 | 1.65 | 10.4 |
| 21 | 719 | 0.342 | 450,000 | 2.7 | 11.0 |
| 35 | 790 | 0.495 | 180,000 | 4.0 | 9.1 |
| 50 | 509 | 0.332 | 42,000 | 6.2 | 13.1 |
| 80 | 715 | 0.629 | 18,000 | 13.0 | 9.8 |
| 86 | 587 | 0.657 | 14,000 | — | 9.8 |
| 100 | — | — | 500 | 88.0 | — |

TABLE III

Properties of PTFE/Glass Filters

| % Glass, Blend | Felt Density g./cm.³ | Packing* Density % Fiber | Percent Leakage at Air Velocity, m./min. | | | |
|---|---|---|---|---|---|---|
| | | | 2.1 | 3.4 | 4.6 | 6.1 |
| 0 | 0.285 | 13.3 | 0.68 | 1.80 | 3.00 | 3.50 |
| 3 | 0.222 | 10.3 | 0.12 | 0.12 | 0.41 | 0.60 |
| 12 | 0.236 | 11.0 | 0.37 | 0.41 | 0.49 | 0.85 |
| 21 | 0.210 | 9.8 | 0.06 | 0.45 | 0.58 | 0.91 |
| 35 | 0.159 | 7.4 | 0.09 | 0.11 | 0.41 | 0.71 |
| 50 | 0.153 | 7.1 | 0.10 | 0.30 | 0.40 | 0.50 |
| 80 | 0.113 | 5.2 | 0.09 | 0.04 | 0.16 | 0.31 |
| 86 | 0.089 | 4.1 | 0.04 | 0.05 | 0.05 | 0.18 |

* $\frac{\text{felt density}}{\text{fiber density}} \times 100$

EXAMPLE 3

PTFE fibers having a denier of 6.7 dpf and a length of 11.43 cm. are hand mixed with glass fibers having a denier of 0.3 dpf and a length of 5.08 cm. Blends are prepared having a glass content of 1, 3, 5, 9, 14, 23 and 28 percent by weight. The blends were passed through a double cylinder picker to achieve a thorough blend of the two fibers. The blends were then passed twice through a laboratory Garnett card to provide a carded batt. A batt of 100% PTFE fibers was prepared by passing 6.7 dpf, 11.43 cm. long fibers once through the laboratory Garnett card. Layered batts containing layers of carded batt were obtained from a cross-lapper located at the end of the card.

Batts containing PTFE and PTFE/glass fibers are manually laid up on one side of a 30.5 cm. wide, 125 g./m.² scrim of woven PTFE fibers in a 4-end mock Leno weave, (12×12 ends/cm.) to obtain approximately 509 g./m.² filters.

The fibers of the layered batts are needle punched into the scrim from the batt side under the following conditions:

36 gauge, 9 barb needles;
1.11 cm. penetration;
7 passes through the machine;
55 needle penetration/cm.²/pass.

The needled composite structures are heat set on a pin frame for five minutes at 260° C. allowing 5% shrinkage in the machine direction and 10% shrinage in the cross direction.

Properties are shown in Table IV.

The lower thickness of the felts of this example is believed to be due to more effective needle penetrations because of a higher level of antistatic spray applied before carding.

TABLE IV

Properties of PTFE/Glass Filters

| % Glass, Blend | Basis wt. g./m.² | Thickness cm. | Air Perm. m³/min/m² | Felt Density g./cm.³ | Packing Density % fiber |
|---|---|---|---|---|---|
| 0 | 637 | 0.227 | 19.3 | 0.345 | 16.0 |
| 1 | 685 | 0.179 | 14.1 | 0.383 | 17.8 |
| 3 | 583 | .178 | 15.0 | 0.328 | 15.3 |
| 5 | 620 | 0.205 | 15.8 | 0.303 | 14.1 |
| 9 | 648 | 0.188 | 13.4 | 0.344 | 16.0 |
| 14 | 617 | 0.212 | 12.8 | 0.291 | 13.5 |
| 23 | 671 | 0.205 | 11.4 | 0.327 | 15.2 |
| 28 | 637 | 0.269 | 10.0 | 0.237 | 11.0 |

| % Glass, Blend | % Leakage at Air Velocity m./min. | | | |
|---|---|---|---|---|
| | 2.1 | 3.4 | 4.6 | 6.1 |
| 0 | 0.09 | 0.15 | 0.21 | 0.38 |
| 1 | 0.03 | 0.01 | 0.04 | 0.06 |
| 3 | 0.05 | 0.04 | 0.08 | 0.13 |
| 5 | 0.03 | 0.05 | 0.04 | 0.05 |
| 9 | 0.02 | 0.02 | 0.02 | 0.04 |
| 14 | 0.02 | 0.02 | 0.02 | 0.02 |

TABLE IV-continued

| 23 | 0.02 | 0.01 | 0.01 | — |
| 28 | 0.01 | 0.01 | 0.01 | 0.02 |

We claim:

1. An intimate blend of poly(tetrafluoroethylene) and glass staple fibers containing 65-99 percent by weight poly(tetrafluoroethylene) fibers having a denier per filament of 2-25 and 1-35 percent by weight glass fibers having a denier per filament of 0.1-1.

2. An improved filter felt comprising a needled batt of the intimate fiber blend of claim 1.

3. The filter felt of claim 2 wherein 1-25 percent by weight glass fibers are used.

4. The filter felt of claim 2 wherein 1-10 percent by weight glass fibers are used.

5. The filter felt of claim 2 wherein one or more batts is needled into a supporting scrim of woven fibers.

6. The filter felt of claim 5 wherein the supporting scrim is made of poly(tetrafluoroethylene) fibers.

7. The filter felt of claim 2 wherein the poly(tetrafluoroethylene) fibers have a denier per filament 5-10.

8. The filter felt of claim 7 wherein the glass fibers have a denier per filament of 0.2-0.4.

9. Process for preparing the filter felt of claim 2 by blending 65-99 percent by weight poly(tetrafluoroethylene) fibers with 1-35 percent by weight glass fibers in a picker, further blending of the fibers in a carding machine, forming a nonwoven batt by crosslapping, combining layers of the batt if necessary to form a layered batt of the desired thickness, needling the batt with a needle loom to provide a felt and heat setting the felt by heating on a tenter frame for at least two minutes at 230°-325° C.

10. The process of claim 9 wherein the layered batt is needled into one or both sides of a woven scrim of poly(tetrafluoroethylene) fibers.

11. The process of claim 10 wherein the needle density is 200 to 400 needle penetrations per square centimeter.